United States Patent [19]
Yamanaka et al.

[11] 3,893,114
[45] July 1, 1975

[54] METHOD AND DEVICE FOR ANTICIPATING A COLLISION

[75] Inventors: Teruo Yamanaka, Seto; Kazuo Sato, Toyota, both of Japan

[73] Assignees: Toyota Jidosha Kogyo Kabushiki Kaisha; Kabushiki Kaisha Toyota Chuo Kenkyusho, both of Aichi, Japan

[22] Filed: Apr. 9, 1973

[21] Appl. No.: 348,941

[30] Foreign Application Priority Data
Apr. 8, 1972   Japan.............................. 47-35339

[52] U.S. Cl...................... 343/7 ED; 343/9; 343/14
[51] Int. Cl.............................................. G01s 9/02
[58] Field of Search...................... 343/7 ED, 9, 14

[56] References Cited
UNITED STATES PATENTS

| | | | |
|---|---|---|---|
| 3,710,383 | 1/1973 | Cherry et al. | 343/7 ED X |
| 3,789,950 | 2/1974 | Strenglein | 343/7 ED X |

*Primary Examiner*—T. H. Tubbesing
*Attorney, Agent, or Firm*—Burgess, Ryan and Wayne

[57] ABSTRACT

A method and device for anticipating vehicle collisions are provided. The wave obtained by mixing the reflected wave from an object with a portion of the frequency-modulated transmitted wave is separated into Doppler signal component, a fundamental wave component and harmonic components. A time interval between a zero-crossing point of one of two components, which are selected from said components and different in phase, and a point at which said two components are equal in intensity is measured thereby detecting accurately a margin time before a collision takes place and anticipating a correct collision of the vehicle against the object. The relative velocity of the object with respect to the vehicle is detected from the Doppler signal component. The level of the reflected wave from the object is detected. The approaching and approaching angle of the object with respect to the vehicle are detected.

27 Claims, 15 Drawing Figures

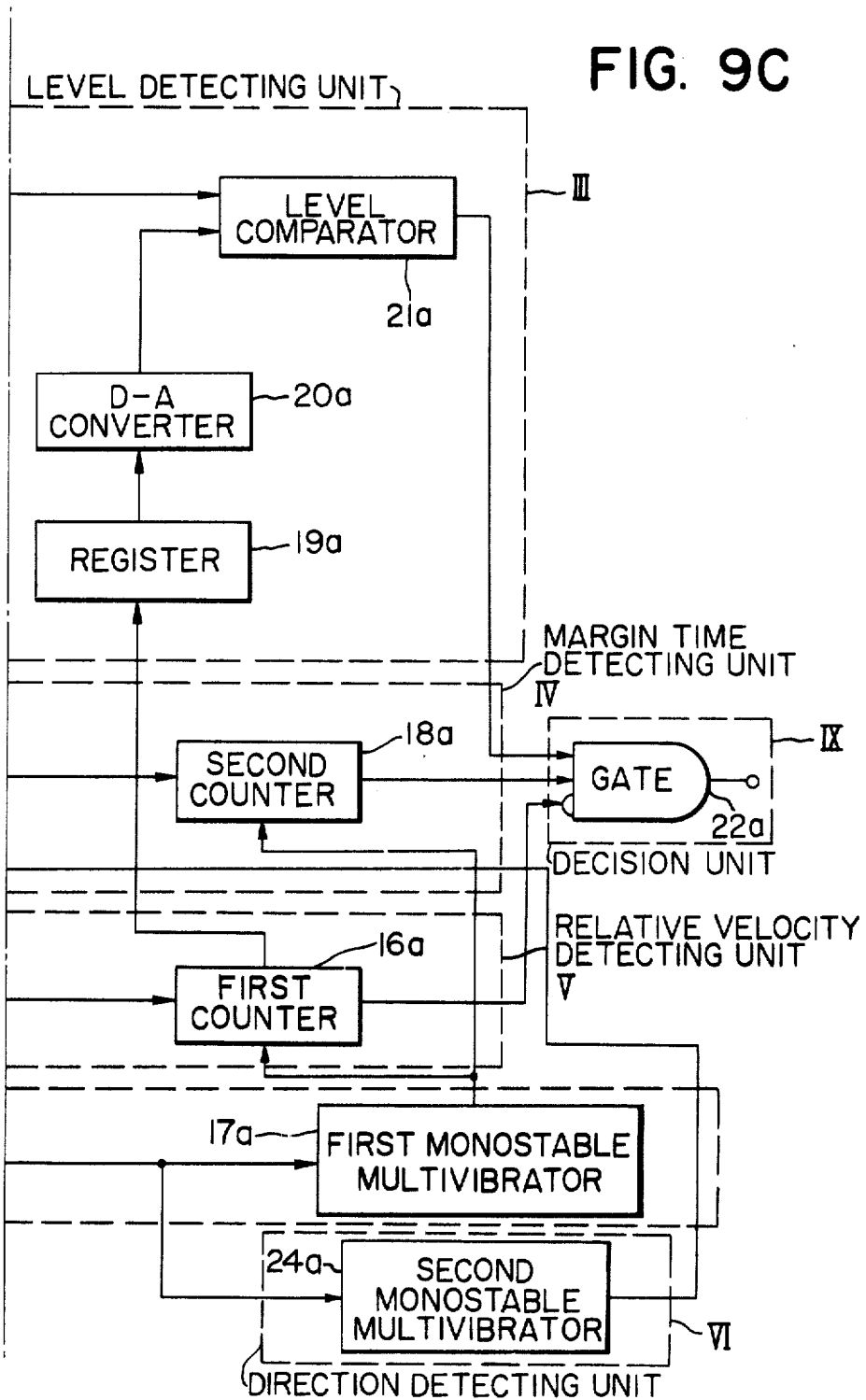

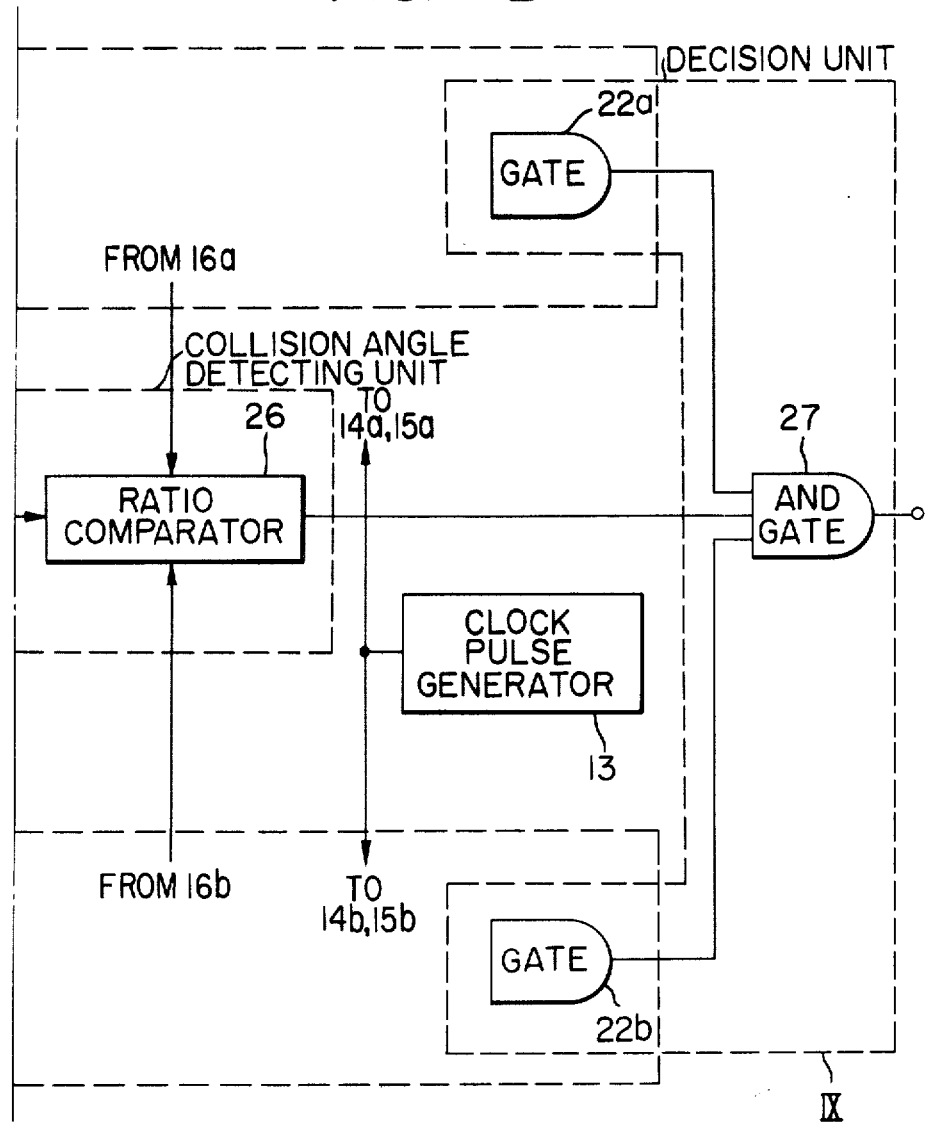

METHOD AND DEVICE FOR ANTICIPATING A COLLISION

RELATED COPENDING APPLICATIONS

U.S. Pat. application, Ser. No. 347,776, filed Apr. 4, 1973.

BACKGROUND OF THE INVENTION

The present invention relates to a method and a device for anticipating the collision of an automotive vehicle against an object by utilizing the wave radiated from the vehicle and reflected by the object, thereby actuating at the optimum time a passive restraint device, for example, a device for inflating a gas bag or the like before the collision takes place so as to surround a driver so that he may be protected from being directly hit against a front dashboard or the like of the vehicle and being seriously injured.

There have been known various safeguarding systems or devices such as a gas bag system, a blanket system and the like which are automatically actuated in case of collision of a vehicle against another vehicle (to be referred to as the "primary collision" in this specification) so that a driver may be prevented from being directly hit against a front dashboard or the like of the vehicle by the inertia (to be referred to as the "secondary collision" in this specification) and being seriously injured.

In the prior art method and device the deceleration velocity of a vehicle in the primary collision is detected to give an electrical signal to open a valve of a container or the like containing the air under pressure thereby inflating a bag. In the prior art method and device of the type described above, the secondary collision may take place before the safeguarding device is actuated, due to the delay in detection of the deceleration velocity in the primary collision. To overcome this problem, the speed with which the safeguarding device is actuated must be considerably increased, so that many difficult technical problems are involved. The defects and problems of the prior art method and device are based upon the fact that the safeguarding device is actuated only after the detection of primary collision. To overcome these defects and problems, the collision signal is to be generated before the primary collision takes place. The same applicants have already proposed a method and device for anticipating the primary collision by the detection of the Doppler frequency contained in a wave obtained by mixing the reflected wave with a portion of the transmitted wave and by the detection of the level of the reflected wave.

Further, in the FM radar system, the distance between an object and the vehicle is measured from the frequency of a wave obtained by homodyning or mixing the reflected wave with a portion of the transmitted wave, so that this system has a fixed error given by $R = C/8 \Delta f$ where $C$ = velocity of a wave; and $\Delta f$ = frequency deviation (which is equal to one half of frequency excursion).

For example, the fixed error $\Delta R$ is of the order of four meters when the frequency deviation is 10 MHz, so that the accuracy of the measurement of the distance to an object within a few hundred meters is considerably lowered. As a result, the frequency deviation $\Delta f$ in the FM radar system must be extremely increased in order that the distance to an object within a few meters may be measured with a required degree of accuracy so as to anticipate or detect the primary collision. The increase in frequency deviation for this purpose often brings about many difficult technical problems.

SUMMARY OF THE INVENTION

The present invention contemplates to further improve the accuracy of the collision anticipating method and device of the type described above, and provides a method and device for anticipating the collision in which both the distance between an object and the vehicle and the relative velocity of the object with respect to the vehicle may be measured even in an extremely close range, in which the measurements have been hitherto impossible by the prior art methods and devices of the type using an FM radar system, thereby giving the collision signal a predetermined time before the primary collision actually takes place.

According to the present invention, the low frequency wave obtained by homodyning or mixing the reflected wave with a portion of the FM-CW transmitted wave is separated into a Doppler signal component, a fundamental wave component and harmonic components, and a specified point in time in one period of at least one of two components selected from said separated components and a point in time in one period at which said two components are equal in intensity so that a time left before the collision takes place may be measured from the measurement of a time interval between said two detected points in time. In addition to the above feature, according to the present invention the level of the reflected wave is detected to see whether an object enters a predetermined distance range from a vehicle; the relative velocity of an object with respect to a vehicle is detected; whether an object is approaching to the vehicle or not is detected; and whether the approaching angle of an object is within a predetermined range or not is also detected.

The most important first feature of the present invention resides in the fact that a collision time or a time left before the collision takes place is not detected from the distance between an object and a vehicle and the relative velocity, but directly detected from the phase relation between at least two frequency components of the low frequency wave and the levels thereof. As a result, a correct collision or margin time free from the error due to the arithmetic operation may be obtained, so that the safeguarding device may be actuated at the optimum time.

In the method and the device according to a second feature of the present invention in which the distance between an object and a vehicle, and the shape and dimensions of an object are detected by the measurement of the level of the reflected wave, the inadvertent operation of the safeguarding device may be prevented when the distance between an object and a vehicle is too long to actuate the safeguarding device or when the primary collision will not actually take place. Thus the reliability of the method and the device may be further improved. In the method and the device according to a third feature of the present invention wherein the relative velocity of an object with respect to a vehicle is measured, the inadvertent operation of the safeguarding device may be prevented when a vehicle is traveling at such a low speed that the primary collision will not cause the secondary collision or a vehicle is entering a garage or is at rest. The method and the device according to a fourth feature of the present invention serve to prevent the inadvertent operation of the safeguarding device when an object is receding away from a vehicle or when a vehicle is moving backward. The method and the device according to a fifth feature of the present invention serve to prevent the inadvertent operation of the safeguarding device when an object is merely passing across the course of a vehicle or when the approaching angle of an object is such that no collision takes place.

Since the collision or margin time is directly measured in accordance with the present invention, the digital processing of the signals may be much facilitated, so that the electronic circuitry may be designed to be simple in construction and the collision anticipating device may be compact in size and inexpensive to manufacture.

BRIEF DESCRIPTION OF THE DRAWING

FIGS. 9A to 9C are detailed block diagrams of the first embodiment of the present invention;

FIG. 11A and 11B are a block diagram of a collision angle detecting unit and its associated component parts of the first embodiment shown in FIG. 8.

Figure 1:
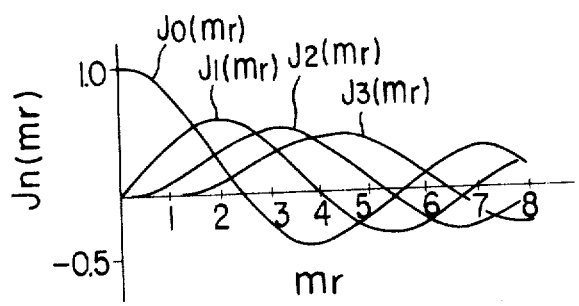
FIGS. 1–7 are graphs used for the explanation of the underlying principle of the present invention.

PRINCIPLE OF MEASUREMENT OF DISTANCE:

According to the present invention, as in the conventional FM radar system, the reflected wave, which is the wave radiated from an antenna and reflected by an object, is homodyned or mixed with the reference wave Ro, that is a portion of the transmitted wave to obtain a low frequency wave or difference frequency signal given by $$e = r\cos\{\omega_c \Delta t + 2m_f \sin \frac{\omega_m \Delta t}{2} \cos(\omega_m t + \frac{\omega_m \Delta t}{2})\}$$

$$= r\cos \omega_c \Delta t \{J_0(m_r) + 2 \sum_{n=1}^{\infty} (-1)^n \cos 2n(\omega_m t + \frac{\omega_m \Delta t}{2}).$$

$$J_{2n}(m_r)\} - r\sin \omega_c \Delta t \{2 \sum_{n=0}^{\infty} (-1)^n \cos\{(2n+1)\cdot$$

$$(\omega_m t + \frac{\omega_m \Delta t}{2})\} J_{2n+1}(m_r)\}\} \quad (1)$$

where
- $r$ = coefficient depending upon the reflection factor of an object, characteristics of mixers, and so on;
- $\omega_c$ = angular frequency of the carrier;
- $\Delta t$ = time interval between the time a wave is transmitted and the time a wave is received;
- $m_f$ = frequency modulation index;
- $\omega_m$ = angular frequency of a modulated wave; and
- $J_{2n}$ = Bessel function or order $2n$ of the first kind.
- $mf = 2\pi\Delta f/\omega_m$ $$m_r = 2m_f \sin \frac{\omega_m \Delta t}{2} \quad (2)$$

$$\Delta t = 2R/C \quad (3)$$

where
- $R$ = distance to an object, and
- $C$ = velocity of a radiation wave.

The low frequency wave given by Eq. (1) will be described in more detail hereinafter.

The low frequency wave is separated or filtered into frequency components such as a Doppler signal component, a fundamental wave component and harmonic components as shown below:

$$rJ(m_r) \cos \omega_c \Delta t,$$

$$-2rJ_1(m_r) \cos(\omega_m t + \frac{\omega_m \Delta t}{2}) \sin \omega_c \Delta t$$

$$-2rJ_2(m_r) \cos(2\omega_m + \omega_m + \omega_m \Delta t) \cos \omega_c \Delta t,$$

When the relative velocity of an object with respect to a vehicle with a collision anticipating device is $v$, and when the angular frequency $\omega_m$ of a modulated wave may be so selected as to satisfy the following relation $$\omega_m \gg \omega_d$$

where $\omega_d$ = Doppler angular frequency, $(2v/C)\omega_c$, the maximum values of the amplitudes of the components or terms of Eq. (1) will become $rJ_0(m_r)$, $2rJ_1(m_r)$, $2rJ_2(m_r)$, . . . The amplitudes of the Doppler signal term, fundamental term and harmonic terms are proportional to $J_0(m_r)$, $J_1(m_r)$, $J_2(m_r)$, . . . which in turn are a function of the time interval $\Delta t$, i.e. the distance between an object and a vehicle, and to the coefficient $r$. since the coefficient $r$ is a constant, the ratios in amplitudes between the terms are independent of the coefficient $r$.

The present invention provides a method and device for anticipating the collision from the digital measurement of a time left before the collision in a close range takes place based upon the relation among the amplitudes $J_0(m_r)$, $2rJ_1(m_r)$, $2rJ_2(m_r)$, . . . of the Doppler signal component, a fundamental wave component and harmonic components, independently of the absolute intensity of the reflected wave which varies depending upon the reflection factor of an object, the sensitivity of the transmitter and receiver, and so on.

The relation between $m_r$ and $Jn(m_r)$ in Eq. (1) is shown in FIG. 1. The amplitude varies in proportion to the Bessel function $Jn(m_r)$ as $m_r$ varies. $m_r$ is a function of the time interval $\Delta t$, hence the distance $R$ between an object and a vehicle when the frequency deviation $\Delta f$ and the angular frequency $\omega_m$ of a modulated wave are constant as shown in Eqs. (2) and (3). Therefore it is possible to measure the distance $R$ between an object and a vehicle from the relation among the amplitudes proportional to $Jn$.

Figure 2:
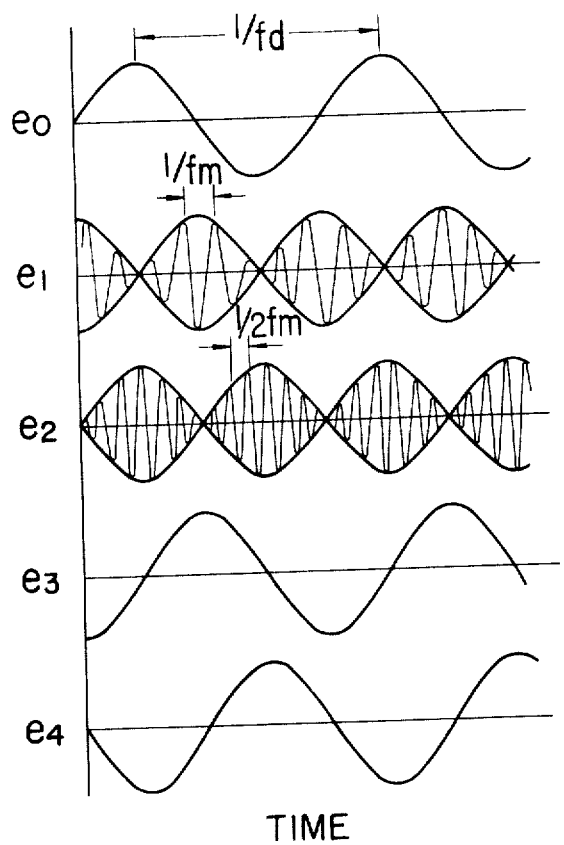

FIG. 2 shows schematically the waveforms of the signals, $J_0$, $J_1$ and $J_2$ derived after they are passed through filters adapted to pass only the frequency lower than the modulation frequency $f_m$ when the object at the distance R from the antenna is moving at the relative velocity $v$; FIG. 2-$e_0$ shows the waveform of the Doppler signal with the amplitude $rJ_0(m_r)$; FIG. 2-$e_1$, the waveform of the fundamental wave with the amplitude $2rJ_1(m_r)$; and with the modulation frequency $f_m$ which is amplitude-modulated by the Doppler signal frequency $f_d$; FIG. 2-$e_2$, the waveform of the second harmonic with the amplitude $2rJ_2(m_r)$ and with frequency twice the modulation frequency which is amplitude-modulated by the Doppler signal frequency $f_d$; FIG. 2-$e_3$, the waveform of the signal which is obtained by demodulating the signal $e_1$ by the modulation frequency $f_m$; and FIG. 2-$e_4$, the waveform of the signal which is obtained by demodulating the signal $e_2$ by the wave of the frequency two times the modulation frequency $f_m$.

As seen from Eq. (1), the signal $e_3$ is different in phase by 90° from the signal $e_0$ and the signal $e_4$ is different in phase by 180° from the signal $e_0$.

Figure 3:
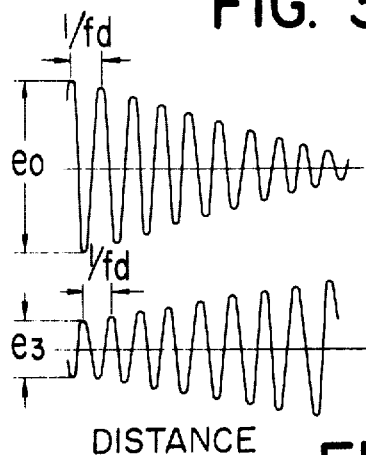

FIG. 3 shows the waveforms of the signals $e_0$ and $e_3$ when the object is moving toward or away from the antenna at the velocity $v$. The frequency $f_d$ of the signals $e_0$ and $e_3$ is in proportion to the relative velocity $v$. The phase of the signal $e_3$ advances by 90° relative to that of the signal $e_0$ when the object is moving toward the antenna, but lags behind by 90° when the object is moving away from the antenna. The amplitudes of the signals $e_0$ and $e_3$ vary in proportion to $J_0(m_r)$ and $J_1(m_r)$, respectively.

Figure 4A:
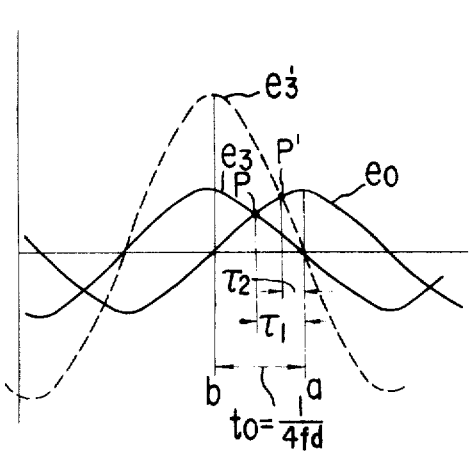
Figure 5:
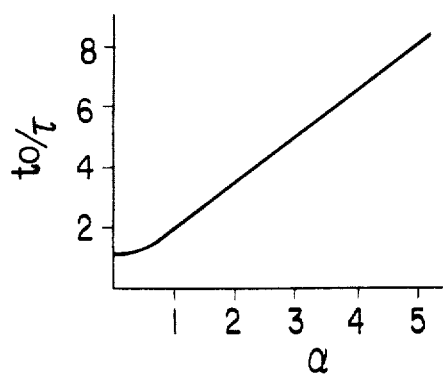

FIG. 4A shows the relation between the parts of the signals $e_0$ and $e_3$ shown in FIG. 3. The waveform indicated by $e_3'$ is the signal when the object is away from the position at which the signal $e_3$ is derived. It is seen that the relative amplitude varies depending upon the distance R to the object. The time interval $t_0$ between the point $a$ at which the signal $e_0$ has the maximum amplitude and the signal $e_3$ or $e_3'$ crosses the zero level and the point $b$ at which the signal $e_3$ or $e_3'$ has the maximum amplitude and the signal $e_0$ crosses the zero level (in principle, the point in time at which the amplitude of one signal is maximum and the point at which the other signal crosses the zero point coincide with each other so that the term "zero cross point" at which the signal crosses the zero level will be used in this specification), is equal to one quarter of the period ($1/f_d$) of the Doppler signal and is in inverse proportion to the Doppler signal frequency $f_d$, that is the relative velocity $v$ of the target. In FIG. 4A, the signal $e_3$ is shown as being behind in phase by 90° relative to the signal $e_0$ when the object is moving away from the antenna, but it will be readily seen that when the object is moving toward the antenna, the signal $e_3$ advances by 90° relative to the signal $e_0$. The point at which the signals $e_0$ and $e_3$ intersect and the point at which the signals $e_0$ and $e_3'$, intersect, that is the point at which the intensities of the signals $e_0$ and $e_3$ are equal and the point at which the intensities of the signals $e_0$ and $e_3'$ are equal, are designated by P and P', respectively. Then the time intervals $\tau_1$ and $\tau_2$ between the points $a$ and P and the points $a$ and P', respectively, are given by $$\tau_1 = t_0(1 - \frac{2\tan^{-1}\alpha}{\pi}), \text{ and}$$
$$\tau_2 = t_0(1 - \frac{2\tan^{-1}\alpha'}{\pi})$$

where $\alpha$ is the ratio between the amplitude of the signals $e_3$ ($e_3'$) and $e_0$ when the amplitude of the signal $e_0$ is 1, and where $\alpha'$ is the ratio between the amplitude of the signals $e_3'$ and $e_0$ when the amplitude of $e_0$ is 1. $t_0$ is equal to one quarter of the wavelength of $f_d$, that is, the time equal to one quarter of the period. The relation between $t_0/\tau$ and the ratio $\alpha$ when the amplitude of the signal $e_0$ is 1 is shown in FIG. 5. It is seen that when $\alpha = 1$, that is when the amplitude of the signal $e_3$ equals that of the signal $e_0$, $t_0/\tau = 2$, that is, the signals $e_0$ and $e_3$ intersect at a point away from the point $a$ by 45° in phase, and $t_0/\tau$ is substantially increased linearly as the ratio $\alpha$ increases up to 5. As will be described in more detail hereinafter, the gains of the amplifiers of the signals $e_0$ and $e_3$ are so selected that $\alpha$ may range between 1 and 5. Since $t_0/\tau_1$ and $t_0/\tau_2$ are a function of $\alpha$ and $\alpha'$ respectively, that is a function of the distance, it may become possible to determine the distance to the object from $t_0/\tau_1$ and $t_0/\tau_2$. It is of course necessary that $\alpha$ must be varied within a range in which $\alpha$ is in proportion to the distance R to the object in order that $t_0/\tau$ may be in proportion to the distance R. Since the signals $e_0$ and $e_3$ are given by the Bessel function $J_0(m_r)$, $J_1(m_r)$, ... the range in which $t_0/t$ is in linear proportion to the distance R may be suitably selected.

Figure 4B:
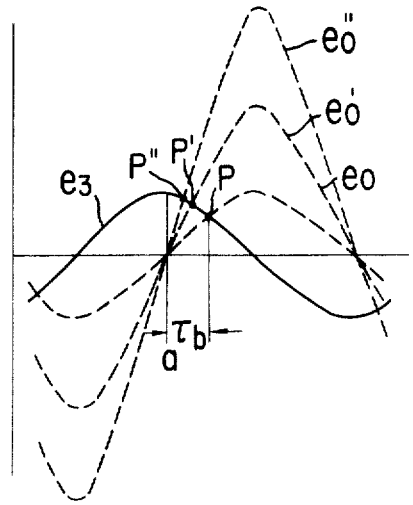

FIG. 4(B) shows the relation between the signals $e_0$ and $e_3$ when the amplitude of the latter is maintained constant whereas the amplitude of the signal $e_0$ is varied. It is seen that as the amplitude of the signal $e_0$ is increased as indicated by the signals $e_0'$ and $e_0''$, that is when $m_r$ is within 2.5 in FIG. 1, the time interval $\tau_b$ between the zero-crossing point $a$ and of the signal $e_0$ and the point of intersection between the signals $e_0$ and $e_3$ is gradually reduced contrarily to the relation shown in FIG. 4(A). That is, $t_0/\tau_b$ is in inverse proportion to the distance R. So far the underlying principle of the present invention has been described when the sine wave is used in frequency modulation, but it will be understood that any waveform similar to the sine wave such as a triangular waveform may be used in frequency modulation.

Next will be described the relation between a distance and a relative velocity required for giving a collision signal to a device for protecting a driver in case of collision a predetermined time (to be referred to as "margin time" in this specification) before the vehicle carrying the collision anticipating device of the present invention collides against an object.

Figure 6:
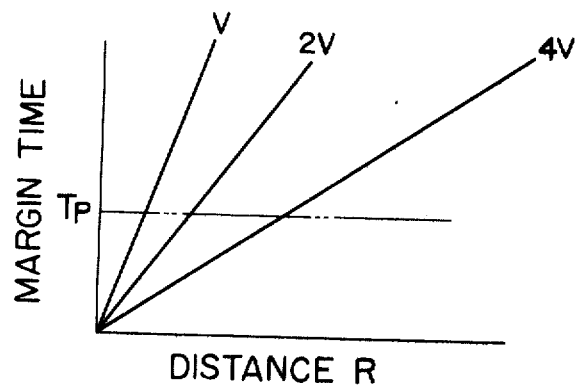

FIG. 6 shows the relation between the collision time T (that is the time left before the vehicle collides against an object) and the distance, the former being plotted along the ordinate and the latter along the abscissa with the relative velocity $v$ (which is substantially equal to the collision velocity because the sufficient deceleration cannot be attained within a very close range) as a parameter. It is seen that when the margin time $T_p$ is predetermined, the distance R at which the collision signal must be generated is proportional to the relative velocity $v$. In other words, the margin time $T_p$ is in inverse proportion to the relative velocity $v$, but is in proportion to the distance R.

$$T_p = K_1 R/v \tag{4}$$

where $K_1$ is a constant.
The period $t_0$ is given by $$t_0 = K_2/v \qquad (5)$$

where $K_2$ is a constant. And as described with reference to FIG. 4(B), $t_0/\tau_b$ is substantially in inverse proportion to the distance $R$, that is $$t_0/\tau_b \approx K_3/R \qquad (6)$$

where $K_3$ is a constant.

Substituting Eqs. (5) and (6) into Eq. (4), we have $$T_p = K_1 K_3 \tau_b/K_2 \qquad (7)$$

Since $K_1$, $K_2$ and $K_3$ are constant, the margin time $T_p$ is proportional to $\tau_b$. Thus the margin time $T_p$ may be measured from $\tau_b$ independently of the relative velocity or collision velocity $v$ when an object is within the predetermined range. Therefore it becomes possible to provide a predetermined time margin required for actuating the safeguarding device before the collision takes place.

Figure 7:
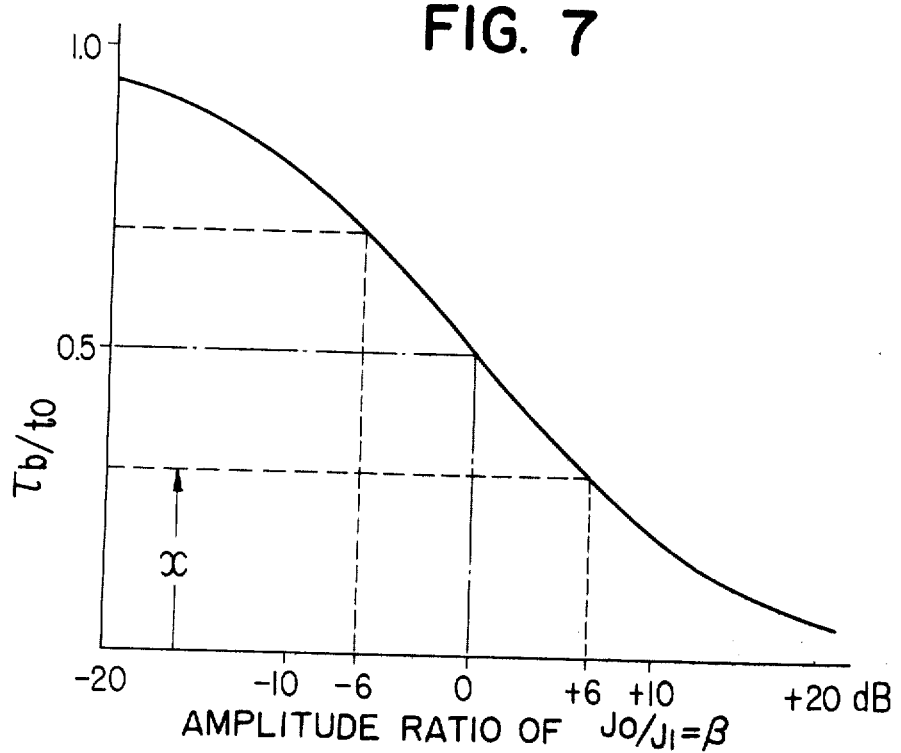

The frequency deviation $\Delta f$ is so adjusted that the ratio between $t_0$ and $\tau_b$ is in direct or inverse proportion to the distance $R$. In this case the measured $\tau_b$ must be corrected so that $\tau_b$ may be in direct proportion to the margin time $T_p$ when the ratio $\beta$ between the amplitudes of the Bessel function $J_0(m_r)$ and $J_1(m_r)$ is limited as described above. FIG. 7 shows the relation between the ratio $\tau_b/t_0$ (plotted along the ordinate) and the amplitude ratio $\beta = J_0/J_{J1}$ (plotted along the abscissa) when the gains of the amplifiers of the signals $e_0$ and $e_3$ are suitably selected. It is seen that $\tau_b$ may be made proportional to the margin time $T_p$ over the about 40dB range of $\beta$. Therefore a predetermined margin of time $T_p$ may be provided independently of the collision velocity. When the ratio $\beta$ is limited within the range between ±6dB, $\tau_b/t_0$ varies only by ±0.2 from 0.5 at the center, and $\tau_6/t_0 = x$ so that $\tau_b$ cannot be made in proportion to $T_p$ ($\tau_6 = \tau_b$ ($\beta = +6$dB). However, this will be compensated in a manner to be described hereinafter so that a predetermined margin time $T_p$ may be provided independently of the collision velocity.

DESCRIPTION OF THE PREFERRED EMBODIMENT

Figure 12:
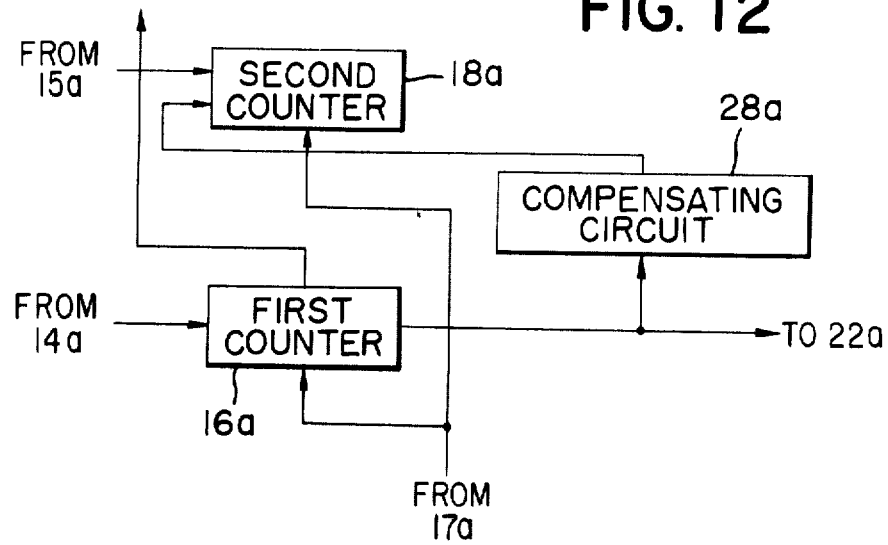
FIG. 12 is a block diagram used for the explanation of a second embodiment of the present invention.
Figure 11A:
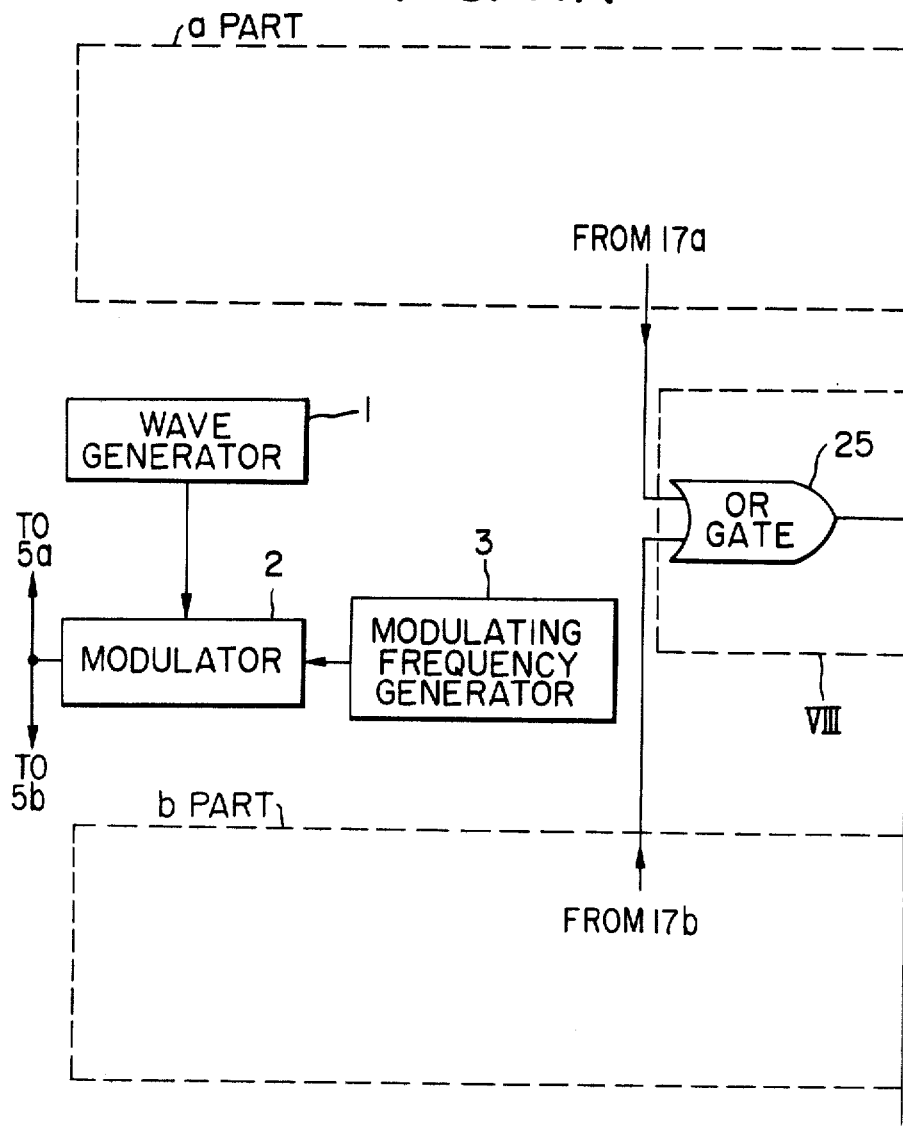

The first embodiment of the collision anticipating device in accordance with the present invention which provides a predetermined margin time will be described hereinafter with reference to FIGS. 8, 9A–9C, 11A and 11B, and the second embodiment in which the amplitude ratio is limited will be described with reference to FIG. 12. FIG. 10 shows the waveforms of the signals used for explanation of the mode of operation of the first and second embodiments.

Figure 8:
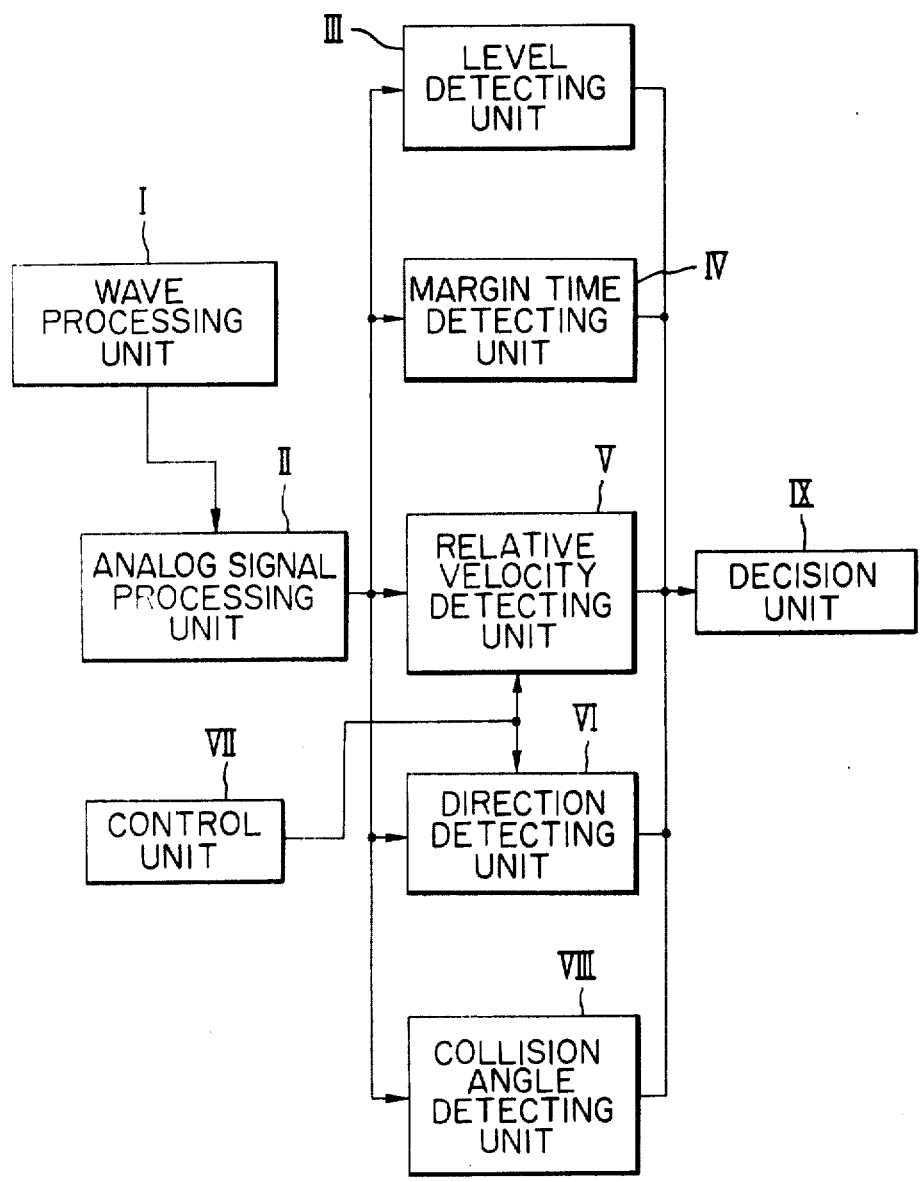
FIG. 8 is a schematic diagram of a first embodiment of a collision anticipating device in accordance with the present invention.

FIG. 8 is the block diagram of the first embodiment generally comprising a wave processing unit I for radiating the FM wave by a transmitting antenna and mixing the signal reflected by an object and received by a receiving antenna with a portion of the transmitted signal for giving the low frequency wave e give by Eq. (1); an analog processing unit II for processing the output signal of the wave processing unit I in an analog manner for extracting the Doppler signal components such as $e_0$ and $e_3$, thereby giving the rectangular waveform output signals whose frequency equals the Doppler signal frequency, the DC output signals in proportion to the intensities of the Doppler signals, and the output signals representing the intensities of the Doppler signals; a lever detecting unit III for detecting the intensity of the Doppler signals; a margin time processing unit IV for giving the margin time; relative velocity detecting unit V for detecting the relative velocity of the object with respect to the vehicle; a direction detecting unit VI for detecting whether an object is closing to or receding from the device based upon the principle described hereinbefore; a control unit VII for controlling the relative velocity detecting unit V and the direction detecting unit VI; a collision angle detecting unit VIII for detecting whether the approaching angle of an object with respect to a vehicle is within a predetermined range or not; and a decision unit IX for detecting whether a device for safeguarding a driver in case of collision must be actuated or not in response to the output signals from the level detecting unit III, the margin time detecting unit IV, the relative velocity detecting unit V, the direction detecting unit VI and the collision angle detecting unit VIII.

Since the highly reliable and dependable operation of the collision anticipating device is required, all of the important factors affecting the correct collision anticipation such as the relative velocity and the direction of the object with respect to the vehicle, the collision angle of the object, and a time left before the collision takes place are measured as shown in FIG. 8. Unlike the prior art system which measures the margin time from the distance between an object and a vehicle and the relative velocity of the object, the margin time detecting unit of the present invention which must be operated in the most reliable manner measures the margin time directly from the time interval based upon the principle described hereinbefore. The collision anticipating device in accordance with the present invention is simple in construction and electronic circuitry, highly reliable in operation and inexpensive to manufacture.

Figure 9A:
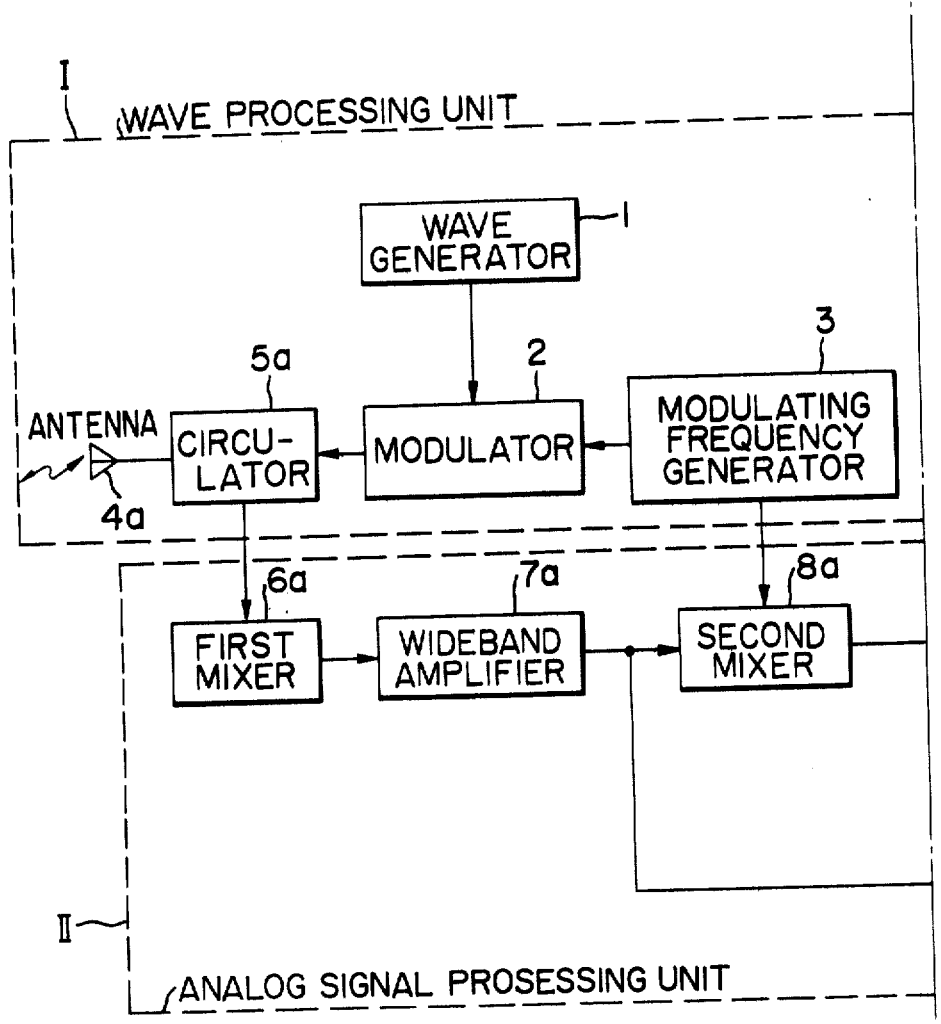
Figure 9B:
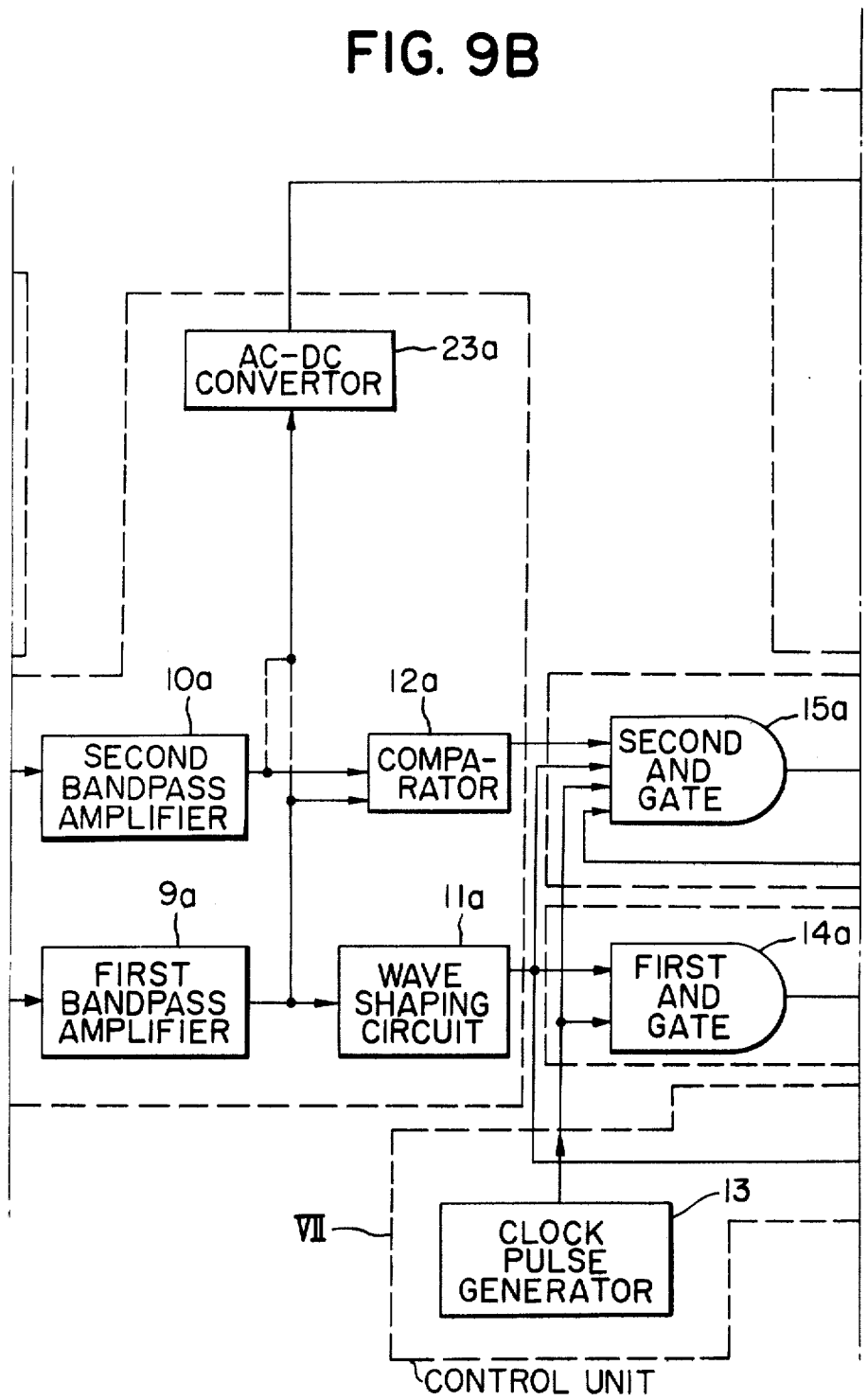
Figure 10:
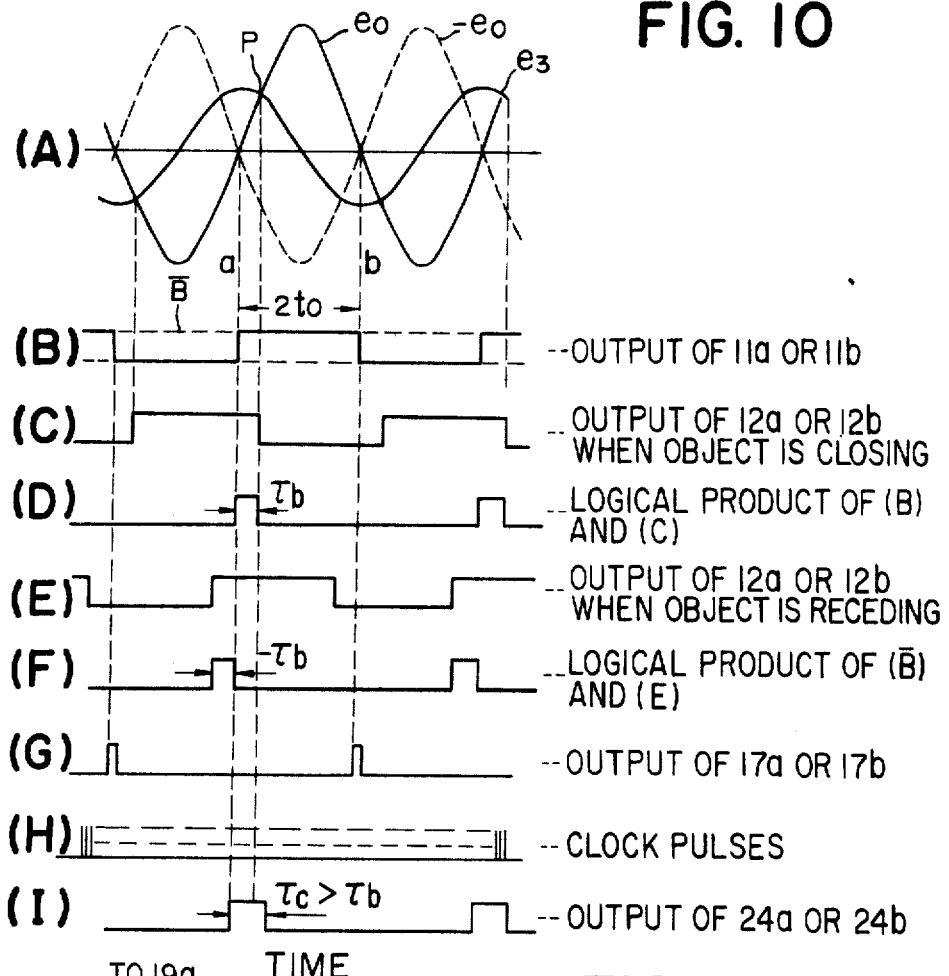
FIG. 10 illustrates the waveforms of the output signals of the various component parts of the first embodiment of the present invention.

FIGS. 9A to 9C are detailed block diagrams of the first embodiment described in brief with reference to FIG. 8.

Wave Processing Unit I

The wave processing unit I generally comprises a wave generator 1, a modulator 2 for modulating the wave to be transmitted, a modulation frequency generator 3 for generating the frequency $f_m$ which is sufficiently higher than the Doppler frequency $f_d$, a transmitting-receiving antenna 4a for radiating the frequency-modulated wave in a predetermined radiation pattern and receiving the transmitted wave reflected by an object; and a circulator 5a for transmitting the output signal from the modulator 2 to the antenna 4a and feeding not only the reflected wave but also a portion of the transmitted wave to a first mixer 6a in the analog processing unit II.

It should be noted that, as will become more apparent from the description to be made with reference to FIG. 11, each component designated by the reference numeral with a suffix $a$ is one of the pair of components similar in construction and operation disposed on the right and left sides and that the other component to be designated by a reference numeral with a suffix $b$ is not shown for the sake of simplicity.

Analog Signal Processing Unit II

The analog signal processing unit II generally comprises the first mixer 6a, a wideband amplifier 7a for amplifying the output signal of the first mixer 6a, a second mixer 8a for mixing the output signal of the wideband amplifier 7a with the modulation frequency $f_m$ from the modulation frequency generator 3 in the wave processing unit I and giving the signal in which a Doppler signal component, a fundamental wave component and harmonic components are superposed one upon another; a first bandpass amplifier 9a for passing only the Doppler signal $e_0$ shown in FIG. 2 from the output signal of the wideband amplifier 7a; a second bandpass amplifier 10a for passing only the signal $e_3$ shown in FIG. 2 out of the output signal of the second mixer 8a; a wave shaping circuit 11a; a comparator 12a and an AC-DC converter 23a.

The wave shaping circuit 11a which is a zero-crossing detector, is adapted to detect the zero-crossings of the Doppler signal $e_0$ shown in FIG. 2 and gives the logic output signal 1 in the positive half cycle of the signal $e_0$ as shown in FIG. 10 (B). The comparator 12a is adapted to output the logic output signal 1 when $e_3 > e_0$ as shown in FIG. 10(C). The AC-DC converter 23a is adapted to convert the AC output signal of the bandpass amplifier 9a or 10a into the DC signal.

Level Detecting Unit III

The level detecting unit III generally comprises a register 19a, a D-A converter 20a and a level comparator 21a.

The register 19a reads and stores the output signal of a counter 16a in the relative velocity detecting unit V in response to the output signal from a first monostable multivibrator 17a in the control unit VII, and the D-A converter 20a converts the digital output signal from the register 19a into the analog signal. The comparator 21a compares the output signal $e_{D-A}$ from the D-A converter 20a with the output signal voltage $e_{DC}$ from the AD-DC converter 23a in the analog processing unit II and gives the logic output signal 1 only when $e_{DA} < e_{DC}$.

Relative Velocity Detecting Unit V

The relative velocity detecting unit V generally comprises a first AND circuit 14a and a first counter 16a. The AND circuit 14a is adapted to pass the clock pulse from a clock pulse generator 13 in the control unit VII when the wave shaping circuit 11a outputs the signal thereto. The counter circuit 16a counts the number of pulses passing through the AND gate 14a for a time interval equal to the half cycle $2t_0$ of the Doppler signal component so as to output the signal 1 when the number of counter pulses is in excess of a predetermined number, thereby inhibiting a gate 22a to be described hereinafter.

Margin Time Detecting Unit IV

The margin time detecting unit VI generally comprises a second AND circuit 15a and a second counter 18a. The AND circuit 15a is adapted to pass the clock pulse from the clock pulse generator 13 when the output signals of the comparator 12a, the wave shaping circuit 11a, and a second monostable multivibrator 24a in the direction detecting unit are simultaneously applied to the AND gate 15a, that is during the time interval $\tau_b$ shown at (D) in FIG. 10. The counter 18a is adapted to count the number of clock pulses passing through the AND gate 15a during the time interval $\tau_b$ and to give the output signal 1 when the number of counted pulses is less than a predetermined number when the reset signal is applied to the counter 18a from a first monostable multivibrator 17a in the control unit VII.

Control Unit VII

The control unit VII comprises the clock pulse generator 13 and the first monostable multivibrator 17a. The clock pulse generator 13 generates the clock pulses as shown in FIG. 10(H), and the monostable multivibrator 17a is adapted to output the reset signals to be applied to the counters 16a and 18a as shown in FIG. 10(G) in response to the fall time ($b$ in FIG. 10(B)) of the output signal of the wave shaping circuit 11a.

Direction Detecting Unit VI

The direction detecting unit VI comprises the second monostable multivibrator 24a which is adapted to output the pulse with a pulse width $\tau_c$ longer than $\tau_b$ as shown in FIG. 10(I) in response to the rise time (at $a$ in FIG. 10(B)) of the output signal of the wave shaping circuit 11a.

Decision Unit IX

The decision unit IX comprises a gate 22a which is adapted to output the signal 1 when the output signals of the counter 18a and the comparator 21a are 1's and when the inhibit signal from the counter 16a is not applied to the gate 22a.

The collision signal is ready to be generated when the relative or collision velocity $v$ is such that a driver may be seriously injured in case of collision, that is when the number of pulses counted by the counter 16a is less than a predetermined number. Also, at each cycle of the Doppler signal, $\tau_b$ is detected which is gradually decreased as the distance between an object and a vehicle is decreased, and the collision signal is ready to be generated when the number of pulses counted by the counter 18a is less than a predetermined number. The collision signal is ready to be generated when the above two conditions are fulfilled and at the same time when the comparator 21a gives the output signal. In other words, the level of the signal $e_0$ or $e_3$ which is applied to the comparator 21a must be higher than a predetermined level at the predetermined distance between an object and a vehicle. The amplitude of the signal $e_0$ or $e_3$ is different depending upon the distance and the reflection factor of an object, but the minimum amplitudes of the signal $e_0$ or $e_3$ for a relatively large object at various ranges may be statistically determined by the power of the transmitted wave and the sensitivity of the transmitter and receiver. The present embodiment is based on the fact that the distance at which the collision signal is to be given is in proportion to the relative velocity of an object. The number of pulses counted by the counter 16a is in inverse proportion to the relative velocity $v$ so that the voltage $e_{D-A}$ which is in inverse proportion to the velocity $v$ and hence the distance R is derived from the D-A converter 20a and is compared with the output voltage $e_{DC}$ representing the signal $e_0$ or $e_3$. In detecting whether or not an object has such a shape or dimensions that the safeguarding device must be actuated at the margin time when the collision signal must be given, the output voltage $e_{D-A}$ is made low when the collision velocity is high whereas it is made high when the collision velocity is low so that unlike the system in which the output voltage $e_{D-4}$ is fixed, the collision signal may be prevented from being inadvertently generated due to a small object such as splashed water or small animal.

When it is required to vary the voltage $e_{D-4}$ in response to the distance, the reciprocal of $\tau_b$ may be used to weight $e_{D-4}$, which may be accomplished in a simple manner.

Next referring to FIG. 10, the signals $e_0$ and $e_3$ when an object is at a certain distance are shown at (A). The amplitude of the signal $e_0$ with respect to that of the signal $e_3$ is increased as the distance to an object is decreased when the object is within a distance less than 2.5 in terms of $m_r$. FIG. 10-(B) shows the output waveform of the wave shaping circuit 11a which is 1 in the positive half cycle of the signal $e_0$. FIG. 10-(C) shows the waveform of the output signal of the comparator 12a which is 1 when $e_3 > e_0$, when the distance to an object is decreasing. FIG. 10-(E) shows the waveform of the output signal of the comparator 12a when the distance to an object is increasing, that is, in case of the receding object FIGS. 10-(D) and -(F) show the logic products of (B) and (C), ($\bar{B}$) and (E) ($\bar{B}$=B reversed in phase in case of the receding object, that is the reversed signal of (B)). The pulse width of the waveforms shown in FIGS. 10-(D) and -(F) corresponds to the time interval $\tau_b$. In the instant embodiment, the margin time is selected in response to the number of clock pulses counted during the time interval $\tau_b$ and the pulse width of the output pulse (see FIG. 10(I)) of the monostable multivibrator 24a which is triggered at the rise time (the point $a$) of the output signal shown in FIG. 10-(B), is so selected as to be longer than predetermined $\tau_b$. As a result, the clock pulses are counted only when the object is approaching, and when the object is receding, the AND gate 15a shown in FIG. 9 is not opened, so that the detection of an object is not effected. FIG. 10-(G) shows the output pulses of the monostable multivibrator 17a which is triggered in response to the fall time (the point $b$) of the output waveform shown in FIG. 10-(B), the output pulses thereof being applied to the counters 16a and 18a for resetting them and for transferring the content in the counter 18a into the register 19a. FIG. 10-(H) shows the clock pulses from the clock pulse generator 13.

FIG. 11 is a block diagram of the collision angle detecting unit VIII and the units and components associated therewith. The collision angle detecting unit VIII functions to detect the angle with which an object is approaching to the collision anticipating device. In case of a vehicle, especially an automotive vehicle, no collision takes places when an object is merely passing across the course of the vehicle. Therefore, two antennas 4a and 4b are installed at the left and right fronts of the vehicle in order to detect the approaching angle of an object from the ratio between the relative velocities measured by the two different antennas 4a and 4b and their associated circuit components.

In the instant embodiment, the collision signal is generated only when the ratio between the numbers of clock pulses counted by the counters 16a and 16b is within a predetermined ratio. As an object is off an extension of the axis of a vehicle which intersects the line connecting the two antennas at the midpoint thereof, a difference in the ratio between the relative velocities measured by the right and left antennas and their associated components will be increased. Therefore according to the present invention the contents of the counters 16a and 16b are read out in response to the output of an OR circuit 25 whose input terminals are connected to the output terminals of the monostable multivibrators 17a and 17b respectively and are compared with each other in a ratio comparator 26. When the ratio between the contents of the counters 16a and 16b is within a predetermined ratio, the ratio comparator 26 outputs the signal 1 which is fed to AND gate 27 together with the output signals of the gates 22a and 22b in the decision unit IX. The AND circuit 27 gives the output or collision signal only when the output signals of the gates 22a and 22b and the ratio comparator 26 are simultaneously applied thereto, thereby actuating the safeguarding device. The collision angle detecting unit VIII is so adjusted that it gives the output 1 when the approaching angle of an object, i.e., an angle between the extensions of the axes of a vehicle and an object is small, and gives the output 0 when the approaching angle is so large that no collision is expected. When the approaching angle is large, the inadvertent operation of the safeguarding device tends to occur, but according to the present invention, the inadvertent operation may be positively prevented.

From the foregoing description it is seen that the method and device for anticipating collision in accordance with the present invention may detect the collision against an object with an extremely high accuracy hitherto unattainable by the prior art methods and devices from the Bessel functions of the orders 0 and 1 or 0 and 3 which are different in phase from each other. The marginal time interval $\tau_b$ which is given as a function of the relative velocity and distance, is made constant independently of the collision velocity so that the collision signal may be given at the optimum time.

In addition to the collision anticipating method described hereinbefore, there may be employed a method in which the point of intersection between the signals $e_0$ and $e_3$ at which they are equal in intensity is so detected that the marginal time interval $\tau$ may be in inverse proportion to the distance. According to this method the collision signal may be given when the number of pulses counted by the counter 18 is in excess of a predetermined number.

When the amplitude ratio $\beta$ is limited, the marginal time interval $\tau_b$ may be so compensated that when the margin time $T_p$ is 0, $\tau_b$ may be also zero. The second embodiment employing the above compensation method in accordance with the present invention is illustrated in FIG. 12. In response to the content of the counter 16a, that is $2t_0$, the content of the counter 18a that is $\tau_b$ is compensated. More particularly, between the counters 16a and 18a is inserted a compensating circuit 28a for compensating Eq. (7) by $x$ shown in FIG. 7. As a result, $T_p = (K_1 \, K_3/K_2) \, (\tau_b - x \, t_0)$ so that $\tau_b$ may be decreased in substance. Thus the margin time is made constant.

In the embodiments of the present invention, the margin time detecting unit, the relative velocity detecting unit and the direction detecting unit process the signals in a digital manner, but it should be understood that the present invention is not limited thereto. In the third embodiment of the present invention, the above units process the signals in an analog manner as will be described in detail with reference to FIGS. 9A to 9C.

Margin Time Detecting Unit

Since the output signal of the comparator 12a is a rectangular waveform signal having a pulse width proportional to the margin time, the comparator 12a is reset every cycle of the Doppler signal and the output thereof is integrated to convert the margin time into a voltage so that the margin time may be measured in terms of voltage. A comparator may compare this voltage with a referencce voltage so that it may give the output signal when the former is higher than the latter.

Relative Velocity Detecting Unit

In the relative velocity detecting unit a monostable multivibrator is operated or triggered in response to the output signal of the Schmitt circuit 11a as in the ordinary frequency-to-voltage converter so that the output signal of the Schmitt circuit 11a may be converted into a rectangular waveform signal with a predetermined pulse width. Thereafter the output pulses of the monostable multivibrator are integrated into the voltage proportional to the Doppler frequency. A comparator compares this voltage with a reference voltage and gives the output signal only when the former is higher than the latter.

Direction Detecting Unit

In the direction detecting unit, the phase of the output signal of the amplifier 10a is compared with that of the amplifier 9a by the conventional phase comparison method so that the output signal may be given only in case of the closing object.

Decision Unit

As in the case of the first and second embodiments the decision unit derives the logical product of the output signals of the margin time detecting unit, the relative velocity detecting unit and the direction detecting unit.

The third embodiment in which all the signals are processed in an analog manner is adapted to match with other analog electronic devices for automotive vehicles.

The novel features of the present invention may be summarized as follows:

1. The present invention is based on the fact that the relative intensities of the Doppler signals $J_0(m_r)$, $J_1(m_r)$, $J_2(m_r)$, . . . are dependent upon the distance R. Therefore according to the present invention a predetermined collision margin time may be determined independently of the relative or collision velocity of an object, by the detection of a time interval between the point of intersection of two signals and a specified point in time of one of the two signals in one cycle thereof. Therefore as compared with the prior art devices of the type determining the collision margin time by the detection of the distance between an object and a vehicle and the relative velocity therebetween, the circuitry according to the invention may be designed simply and manufactured inexpensively. Moreover the present invention may directly detect the collision margin time by counting the clock pulses so that the signals may be digitally processed. As a result the electronic circuitry may be simple in construction, and the detection can be made with an extremely high degree of accuracy.

2. Since the level detecting unit, the relative velocity detecting unit, the direction detecting unit and the collision angle detecting unit are provided, the distance between an object and a vehicle, the shape, dimensions and reflection factor of an object, the relative velocity, the direction and the approaching angle of an object may be all detected, so that the inadvertent operation of the safeguarding device may be positively prevented and the actuation of the safeguarding device at the optimum time may be ensured.

It should be understood that various modifications and variations of the method for detecting the point of intersection of the two signals at which the intensities thereof are equal, the method for detecting the cycles of the signals, or the device for determining the margin time by detecting the marginal time intervals $\tau$ over a few cycles of the signals, to obtain the mean of the marginal time intervals may be effected within the scope of the present invention.

What is claimed is:

1. A method for anticipating a collision utilizing transmitted and reflected frequency-modulated continuous waves comprising
    transmitting a wave to an object and receiving a wave reflected therefrom,
    mixing a transmitted wave and a reflected wave so as to derive a low frequency wave, separating a first Doppler signal component from said low frequency wave, separating a fundamental wave component and harmonic components from said low frequency wave, and deriving additional Doppler signal components from said fundamental wave component and harmonic components, and selecting at least two components different in phase with respect to each other from said first and additional Doppler signal components;
    detecting a specified point in time in one period of one of said selected components and a point in time in one period at which said selected components are equal in intensity;
    detecting a time interval between said two detected points in time and
    generating a signal when said time interval reaches a predetermined time interval.

2. A method for anticipating a collision according to claim 1 further comprising detecting the level of the reflected wave and generating a signal when an object enters a predetermined distance range from a vehicle.

3. A method for anticipating the collision according to claim 1 further comprising detecting the relative velocity of an object with respect to a vehicle and generating a signal when said relative velocity reaches a predetermined velocity.

4. A method for anticipating the collision according to claim 1 further comprising detecting whether an object is approaching to a vehicle or not, and generating a signal when the object is approaching to the vehicle.

5. A method for anticipating the collision according to claim 1 further comprising detecting the approaching angle of an object with respect to a vehicle, and generating a signal when said approaching angle reaches a predetermined range.

6. A method for anticipating the collision according to claim 1 further comprising
    detecting the level of the reflected wave and generating a signal when an object enters a predetermined distance range from a vehicle;
    detecting the relative velocity of the object with respect to the vehicle and generating a signal when said relative velocity reaches a predetermined velocity, detecting whether the object is approaching to the vehicle or not and generating a signal when the object is approaching to the vehicle, and detecting the approaching angle of the object with respect to the vehicle and generating a signal when said approaching angle reaches a predetermined range.

7. A collision anticipating device utilizing transmitted and reflected frequency-modulated continuous waves comprising A. wave processing means comprising means for transmitting a wave to an object and for receiving a wave reflected therefrom, B. analog signal processing means comprising means for mixing reflected wave with a portion of a transmitted wave so as to derive a low frequency wave, means for separating a first Doppler signal component from said low frequency wave, means for separating a fundamental wave component and harmonic components from said low frequency wave and for separating additional Doppler signal components from said fundamental wave component and harmonic components, means for selecting at least two components which are different in phase from each other from said first and additional Doppler signal components, wave shaping means for detecting a specified point in time in one period of said selected components and comparator means for detecting a point in time in one period at which said selected components are equal in intensity;

C. margin time detecting means comprising means for detecting a time interval between said two detected points in time and generating a signal when said time interval reaches a predetermined time interval; and D. decision means for generating a signal when said means for detecting a time interval generates a signal.

8. A collision anticipating device according to claim 7 further comprising level detecting means for detecting the level of the reflected wave and generating a signal when an object enters a predetermined distance range from a vehicle.

9. A collision anticipating device according to claim 8 further comprising relative velocity detecting means for detecting the relative velocity of the object with respect to the vehicle and generating a signal when said relative velocity reaches a predetermined velocity, direction detecting means for detecting whether the object is approaching to the vehicle or not approaching angle detecting means for detecting the approaching angle of the object with respect to the vehicle and generating a signal when said approaching angle reaches a predetermined range.

10. A collision anticipating device according to claim 9 wherein a. said wave processing means comprises a wave generator, a modulating frequency generator, a modulator for frequency modulating the wave generated by said wave generator into a transmitted wave, an antenna adapted to transmit said transmitted wave and receive the reflected wave from an object, and a circulator for transmitting said transmitted wave to said antenna and transmitting a portion of said transmitted wave and said reflected wave to a first mixer, b. said analog signal process means comprises said first mixer, a wideband amplifier for amplifying the output of said first mixer, a first bandpass amplifier for transmitting only a first predetermined frequency component of the low-frequency signal derived from said wideband amplifier, a second mixer for mixing the output of said wideband amplifier with the output of said modulating frequency generator, a second bandpass amplifier for transmitting only a second predetermined frequency component different in phase and frequency from said first predetermined frequency component, a waveshaping circuit for generating the rectangular waveform signal 1 as long as the output of said first bandpass amplifier continues positive, a comparator for generating the rectangular waveform signal 1 as long as the output signal from said bandpass amplifier is higher than the output signal of said first bandpass amplifier, and an AC-DC converter for converting either of the AC output signals from said first or second bandpass amplifier into the DC signal, c. said margin time detecting means comprises a clock pulse generator, a first AND gate for transmitting the clock pulses from said clock pulse generator only when the output signals of said wave shaping circuit and said comparator are 1 simultaneously, a first monostable multivibrator adapted to generate the pulse when the output signal of said waveshaping circuit falls, and a first counter for counting the clock pulses transmitted through said first AND gate and giving the output signal 1 when the clock pulses counted by said first counter are less than a predetermined number when the reset signal is derived from said first monostable multivibrator, d. said decision means comprises a gate connected to said first counter, a level comparator and a second counter, and adapted to provide the signal 1 when the output signals of said first counter and said level comparator are 1's and when the inhibit signal from said second counter is not applied to said gate, e. said level detecting means for detecting the level of the reflected wave comprises a register for storing therein the contents of said second counter in response to the output signal of said first monostable multivibrator, a D-A converter for converting the digital output of said register into the analog output, and said level comparator comparing the output voltage of said AC-DC converter with the output voltage of said D-A converter and giving the outut signal 1 when the former is higher than the latter, f. said relative velocity detecting means for detecting the relative velocity comprises a second AND gate for transmitting therethrough the clock pulses from said clock pulse generator when the output of said wave shaping circuit is 1, and said second counter counting the clock pulses from said second AND gate and giving the output signal when the clock pulses counted by said second counter are in excess of a predetermined number, g. said direction detecting means for detecting whether an object is approaching a vehicle or not comprises a second monostable multivibrator for generating and transmitting the output 1 in response to the rise of the output signal of said wave shaping circuit for a time slightly longer than the conduction of "ON" time of said first AND gate, and h. said approaching angle detecting means for detecting the approaching angle comprises an additional unit comprising an analog processing means, a margin time detecting means and relative velocity detecting means substantially identical to said first-mentioned analog processing means, margin time detecting means and relative velocity detecting means, an OR gate for transmitting therethrough either of the output signals from said monostable multivibrators in said margin time detecting means, and a ratio comparator connected to said second counters in said relative velocity detecting means, for comparing the contents of said second counters and giving the output signal 1 when the difference is less than a predetermined value.

11. A collision anticipating device according to claim 9, wherein said wave processing means comprises two wave processing units, said analog signal processing means comprises two analog signal processing units, said margin time detecting means comprises two margin time detecting units, said decision means comprises a decision unit, said level detecting means comprises two level detecting units, said relative velocity detecting means comprises two relative velocity detecting units, said direction detecting means comprises two direction detecting units, and said approaching angle detecting means comprises an approaching angle detecting unit.

12. A collision anticipating device according to claim 11 wherein a. said wave processing unit comprises a wave generator, a modulating frequency generator, a modulator for frequency modulating the waves generated by said wave generator into a transmitted wave, an antenna adapted to transmit said transmitted wave and receive the reflected wave from an object, and a circulator for transmitting said transmitted wave to said antenna and transmitting a portion of said transmitted wave and said reflected wave to a first mixer, b. said analog signal processing unit comprises said first mixer, a wideband amplifier for amplifying the output of said first mixer, a first bandpass amplifier for transmitting only a first predetermined frequency component of the low frequency signal derived from said wideband amplifier, a second mixer for mixing the output of said wideband amplifier with the output of said modulating frequency generator, a second bandpass amplifier for transmitting only a second predetermined frequency component different in phase and frequency from said first predetermined frequency component, a wave shaping circuit for generating the rectangular wave form signal of 1 as long as the output of said first bandpass amplifier continues positive, a comparator for generating the rectangular wave form signal 1 as long as the output signal from said second bandpass amplifier is higher than the output signal of said first bandpass amplifier, and an AC-DC converter for converting either of the AC output signals from said first or second bandpass amplifier into the DC signal, c. said margin time detecting unit comprises a clock pulse generator, a first AND gate for transmitting the clock pulses from said clock pulse generator only when the output signals of said wave shaping circuit and said comparator are 1 simultaneously, a first monostable multivibrator adapted to generate the pulses when the output signal of said wave shaping circuit falls, and a first counter for counting the clock pulses transmitted through said first AND gate and giving the output signal 1 when the clock pulses counted by said first counter is less than a predetermined number when the reset signal is derived from said first monostable multivibrator, d. said decision unit comprises two gates each connected to said first counter, a level comparator and a second counter and adapted to provide a 1 when the output signals of said first counter and said level comparator are 1's and when the inhibit signal from said second counter is not applied to said gate, and an AND gate connected to said two gates, e. said level detecting unit means for detecting the level of the reflected wave comprises a register for storing therein the content of said second counter in response to the output signal of said first monostable multivibrator, a D-A converter for converting the digital output of said register into the analog output, and said level comparator comparing the output voltage of said AC-DC converter with the output voltage of said D-A converter and providing an output signal 1 when the former is higher than the latter, f. said relative velocity detecting unit for detecting the relative velocity comprises a second AND gate for transmitting therethrough the clock pulses from said clock pulse generator when the output of said wave shaping circuit is 1, and said second counter counting the clock pulses from said second AND gate and giving the output signal when the clock pulses counted by said second counter are in excess of a predetermined number, g. said direction detecting unit for detecting whether an object is approaching a vehicle or not comprises a second nonostable multivibrator for generating and transmitting the output 1 in response to the rise of the output signal of said wave shaping circuit for a time slightly longer than the conduction or ON time of said AND gate, and h. said approaching angle detecting unit for detecting the approaching angle comprises an OR gate connected to said first monostable multivibrator in said margin time detecting units and a ratio comparator connected to said OR gate and to said second counter in said relative velocity detecting units, for comparing the contents of said second counter and providing an output signal 1 when the difference is less than a predetermined value.

13. A collision anticipating device according to claim 8 wherein said level detecting means comprises a register, a D-A converter connected to said register for converting the digital output of said register into the analog output, and a level comparator having inputs connected to said analog signal processing means and to said D-A converter and having an output connected to said decision means.

14. A collision anticipating device according to claim 7 further comprising relative velocity detecting means for detecting the relative velocity of an object with respect to a vehicle and generating a signal when said relative velocity reaches a predetermined velocity.

15. A collision anticipating device according to claim 14 wherein said relative velocity detecting means for detecting the relative velocity comprises 16. A collision anticipating device according to claim 7 further comprising direction detecting means for detecting whether an object is approaching a vehicle or not and generating a signal when the object is approaching to the vehicle.

17. A collision anticipating device according to claim 16 wherein said direction detecting means for detecting whether an object is a first monostable multivibrator for generating and transmitting the output 1 in response to the rise of the output signal of said wave shaping means.

18. A collision anticipating device according to claim 7 further comprising approaching angle detecting means for detecting the approaching angle of an object with respect to a vehicle and generating a signal when said approaching angle reaches a predetermined range.

19. A collision anticipating device according to claim 18, further comprising relative velocity detecting means which comprises two relative velocity detecting units, wherein said wave processing means comprises two wave processing units, wherein said analog signal processing means comprises two analog signal processing units, wherein said margin time detecting means comprises two margin time detecting units, wherein said decision means comprises a decision unit, and wherein said approaching angle detecting means comprises an approaching angle detecting unit which comprises an OR gate connected to said margin time detecting units and a ratio comparator connected to said OR gate and to said relative velocity detecting units.

20. A collision anticipating device according to claim 7, wherein said margin time detecting means comprises digital signal processing means for detecting said time interval.

21. A collision anticipating device according to claim 7, wherein said margin time detecting means comprises analog signal processing means for detecting said time interval.

22. A collision anticipating device according to claim 7, wherein said margin time detecting means comprises means for generating a signal when said interval reaches a constant predetermined time interval.

23. A collision anticipating device according to claim 22, wherein said margin time detecting means comprises a clock pulse generator, a first AND gate for transmitting the clock pulse from said clock pulse generator only when the output signals of said wave shaping means and said comparator means are 1 simultaneously, a first monostable multivibrator adapted to generate a pulse when the output signal of said wave shaping means falls, and a first counter for counting the clock pulses transmitted through said first AND gate and giving the output signal 1 when the clock pulses counted by said first counter is less than a predetermined number when the reset signal is derived from said first monostable multivibrator.

24. A collision anticipating device according to claim 7, wherein said margin time detecting means comprises means for generating a predetermined time interval signal proportional to a distance between the vehicle and the object, means for comparing said time interval between said two detected points with said generated predetermined time interval signal, and means for generating a signal when said time interval is equal to said generated predetermined time interval signal.

25. A collision anticipating device according to claim 24, wherein said margin time detecting means comprises a clock pulse generator, a first AND gate for transmitting the clock pulse from said clock pulse generator only when the output signals of said wave shaping means and said comparator means are 1 simultaneously, a first monostable multivibrator means for generating a pulse when the output signal of said wave shaping means falls, and a first counter for counting the clock pulses transmitted through said first AND gate and giving the output signal 1 when the clock pulses counted by said first counter is less than a predetermined number when the reset signal is derived from said first monostable multivibrator, and a compensating circuit for compensating the content of said first counter.

26. A collision anticipating device according to claim 7, wherein
said wave processing means comprises two wave processing units,
said analog signal processing means comprises two analog signal processing units,
said margin time detecting means comprises two margin time detecting units, and
said decision means comprises a decision unit for generating a signal when said two margin time detecting units generate each signal.

27. A collision anticipating device according to claim 7 wherein
a. said wave processing means comprises
a wave generator,
a modulating frequency generator,
a modulator for frequency modulating the waves generated by said wave generator into a transmitted wave,
an antenna adapted to transmit said transmitted wave and receive the reflected wave from an object, and
a circulator for transmitting said transmitted wave to said antenna and transmitting a portion of said transmitted wave and said reflected wave to a first mixer,
b. said analog processing means comprises
said first mixer,
a wideband amplifier for amplifying the output of said first mixer,
a first bandpass amplifier for transmitting only a (first) predetermined frequency component of the low frequency wave derived from said wideband amplifier,
a second mixer for mixing the output of said wideband amplifier with the output of said modulating frequency generator,
a second bandpass amplifier for transmitting only a second predetermined frequency component different in phase and frequency from said first predetermined frequency component,
a wave shaping circuit for generating the rectangular waveform signal 1 as long as the output of said first bandpass amplifier continues positive, and a comparator for generating the rectangular waveform signal 1 as long as the output signal from said second bandpass amplifier is higher than the output signal of said first bandpass amplifier,
an AC-DC converter for converting one of the Doppler signal components into a DC signal,
c. said margin time detecting means comprises
a clock pulse generator,
a first AND gate for transmitting the clock pulse from said clock pulse generator only when the output signals of said waveshaping circuit and said comparator are 1 simultaneously,
a first monostable multivibrator adapted to generate the pulse when the output signal of said waveshaping circuit falls, and
a first counter for counting the clock pulses transmitted through said first AND gate and giving the output signal 1 when the clock pulse is counted by said first counter are less than a predetermined number when the reset signal is derived from said first monostable multivibrator,
d. said decision means comprises
a gate adapted to provide an output signal 1 in response to the output signal from said first counter.

* * * * *

UNITED STATES PATENT OFFICE
CERTIFICATE OF CORRECTION

Patent No. 3,893,114   Dated July 1, 1975

Inventor(s) Teruo Yamanaka, et al

It is certified that error appears in the above-identified patent and that said Letters Patent are hereby corrected as shown below:

Column 15, line 17: After "mixing" add --a--.

Column 19, line 41: After "comprises" add --a first AND gate and a first counter connected to said first AND gate--.

Signed and Sealed this eighteenth Day of November 1975

[SEAL]

Attest:

RUTH C. MASON
Attesting Officer

C. MARSHALL DANN
Commissioner of Patents and Trademarks